(12) United States Patent
Leifheit (10) Patent No.: US 10,807,538 B2
(45) Date of Patent: Oct. 20, 2020

(54) MULTIPIECE CENTER CONSOLE DIVIDER SYSTEM

(71) Applicant: Salex, LLC, Littleton, CO (US)

(72) Inventor: Todd G Leifheit, Littleton, CO (US)

(*) Notice: Subject to any disclaimer, the term of this patent is extended or adjusted under 35 U.S.C. 154(b) by 6 days.

(21) Appl. No.: 16/367,523

(22) Filed: Mar. 28, 2019

(65) Prior Publication Data

US 2020/0172293 A1 Jun. 4, 2020

Related U.S. Application Data

(60) Provisional application No. 62/773,645, filed on Nov. 30, 2018.

(51) Int. Cl.
*B60R 7/04* (2006.01)
*B65D 25/04* (2006.01)

(52) U.S. Cl.
CPC ............... *B60R 7/04* (2013.01); *B65D 25/04* (2013.01)

(58) Field of Classification Search
CPC .. B60R 7/04; B60R 7/08; B60R 7/087; B60R 7/088
USPC .... 296/24.34, 37.8; 220/528, 529, 531, 533, 220/552; 312/348.3
See application file for complete search history.

(56) References Cited

U.S. PATENT DOCUMENTS 6,966,450 B2 * 11/2005 Askew ................... B65D 25/06
220/529
7,121,407 B2 * 10/2006 Hurt ........................ A01K 97/06
206/373

* cited by examiner

*Primary Examiner* — Dennis H Pedder
(74) *Attorney, Agent, or Firm* — Leyendecker & Lemire, LLC (57) ABSTRACT

A divider-type organizer that make use of the center console's interior walls in forming some or all of the individual bins and wherein the organizer's planar divider pieces extend generally orthogonally from one surface of an adjoining piece without extending significantly outwardly from the opposing side of the adjoining piece.

13 Claims, 5 Drawing Sheets

MULTIPIECE CENTER CONSOLE DIVIDER SYSTEM

RELATED APPLICATIONS

This application claims priority to and incorporates fully by reference U.S. Provisional Patent Application No. 62/773,645 filed on Nov. 30, 2018 entitled Multipiece Multicompartment Center Console Organizer/Divider and having the same inventor as the present application.

BACKGROUND

Center console compartments on passenger cars and trucks are well known. Often, they comprise a single undivided bin in which a user can store things.

Figure 1:
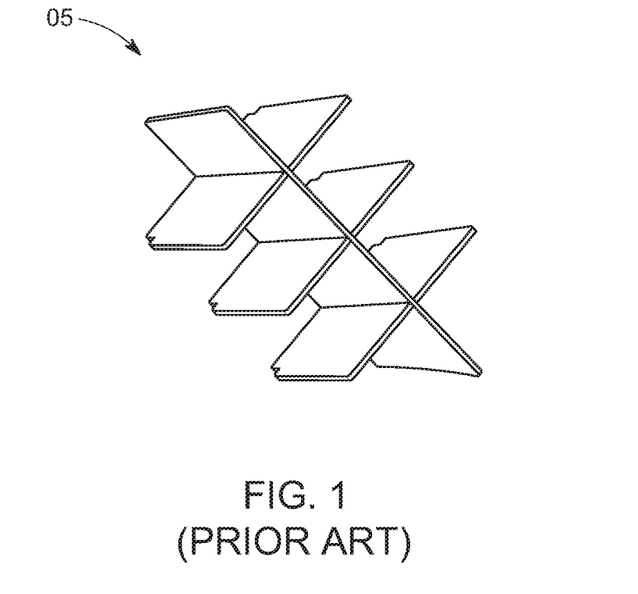
FIG. 1 is a perspective view of a prior art X-joint divider-type organizer.

Molded tray organizers comprising a plurality of predetermined bins are known that can be lowered into many types of center console compartments. Further, organizers comprising interlocking divider plates 05 as shown in prior art FIG. 1 are known wherein orthogonal planar pieces slide together at opposing slots to make one or more cross-shaped junctions. These X-joint divider organizers can make use of the interior walls of the console compartment to complete a compartment.

When the center console's top opening is smaller in width and length than the compartment itself as is the case on a number of center consoles in certain makes and models of vehicles, prior art molded tray and divider organizers that span the entire width and length of the compartment cannot be used.

DETAILED DESCRIPTION

Embodiments of the present invention comprise a divider-type organizer (or divider system) that also make use of the center console's interior sidewalls in forming some or all of the individual bins and wherein the organizer's planar divider pieces extend generally orthogonally from one surface of an adjoining piece without extending outwardly from the opposing side of the adjoining piece.

Of significance in one or more embodiments is the manner in which the various generally planar pieces attach to one another, such that a joining piece extends generally orthogonally from a first surface of a mating piece but is generally flush with the other side of the mating piece to form a T-joint. A typical mating piece includes one or more top and bottom aligned slot pairs with the longer top slot having a female dovetail cross section. An associated joining piece comprises top and bottom edge protrusions that are substantially similar in length to the respective top and bottom slots to which it is to mate. The top protrusion has a male dovetail cross section sized to be firmly received in the top slot. The depth of the protrusion is similar to the thickness of the corresponding slot facilitating its edge being flush with the opposing side of the mating piece. Numerous slots and protrusions can be provided on the various pieces to facilitate the creation of a finished divider. It is further appreciated that planar pieces of embodiments of the organizer can have both mating piece and joining piece features.

Like some prior art divider-type organizers, the inner walls of the vehicle center console (or compartment) are used to comprise the outer walls of the organizer's outer bins. Further, in at least some embodiments, the end edges of the various pieces are shaped as necessary to fit against the inner sidewall of a particular compartment to provide a custom fit.

As can be appreciated, other manner and mechanisms for coupling the various pieces together are contemplated. For instance, the joining pieces could have thicker portions molded along its length that form slots or protrusions in which correspondingly-shaped protrusions or slots on the end of the joining pieces could be received. In other variations, for instance, the joining pieces could terminate in a flange that can be mechanically fastened to the mating pieces using suitable fasteners.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "approximately" and "substantially" as used in this specification and appended claims, refers to plus or minus 10% of the value given.

The terms "about" and "generally" as used in this specification and appended claims, refers to plus or minus 20% of the value given.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "joining piece" as used herein comprises a piece, often generally planar, of a divider-type organizer system wherein a left or right generally vertically disposed end thereof is configured to lockably join with a "mating piece".

The term "mating piece" as used herein comprises a piece, often generally planar, of a divider-type organizer system wherein the piece is configured along its length in one or more locations to lockably join with an end of a "joining piece". A piece of the organizer system can also have both one or more ends configured to join with a "mating piece" and locations along its length configured to join with a "joining piece" making it both a joining and a making piece.

The term "T-joint" as used herein refers to a joint between two pieces, typically planar, wherein a first piece has a first surface and an opposing second surface. The second piece has at least a first end. The second piece is coupled or joined to the first surface of the first piece by way of the first end and extends outwardly and generally orthogonally from the first surface. In contrast to an X-joint, the second piece does not extend appreciably outwardly from the second surface. Typically, although not exclusively, the first end of the second piece does not extend outwardly of the second surface at all. As specifically provided in the specification herein, one type of T-joint is illustrated and described comprising a dove-tail joint; however, other types of T-joints can be utilized.

An Embodiment of a Console Organizer

Figure 2:
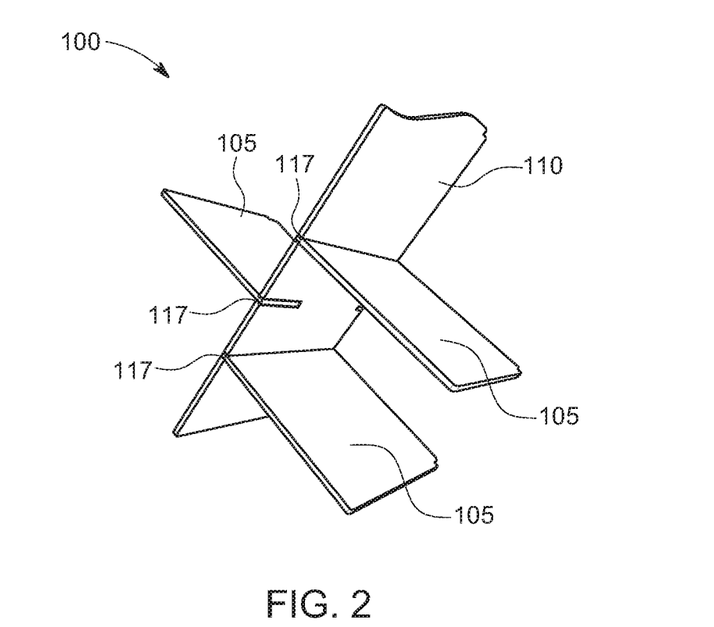
FIG. 2 is a top perspective view of an assembled organizer according to one embodiment of the present invention.
Figure 3:
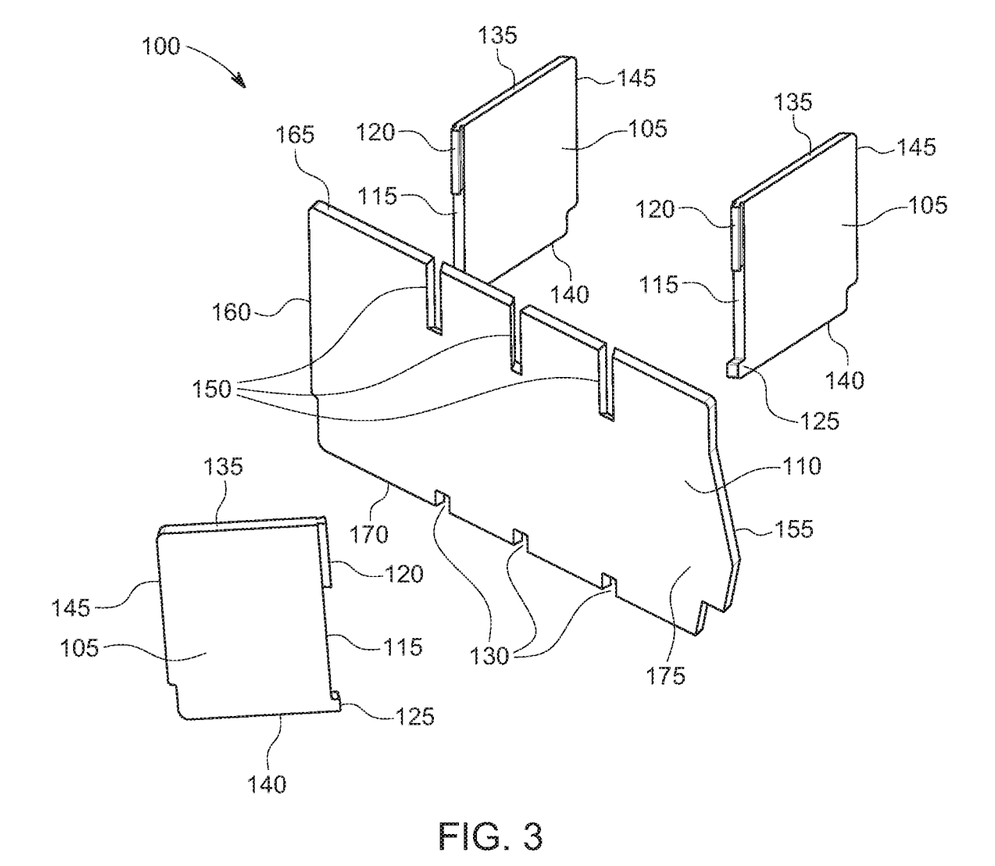
FIG. 3 is an exploded perspective view of an organizer according to one embodiment of the present invention.

FIGS. 2 & 3 are an illustration of an embodiment of a console organizer divider system 100. This particular embodiment comprises a total of four substantially planar pieces: three joining pieces 105, and one mating piece 110. The joining pieces lockably attach to the mating piece each forming a T-joint 117 (also see FIG. 4E), and when received in a center console compartment for which the divider system was particularly designed, a plurality of individual bins are created.

Figure 5:
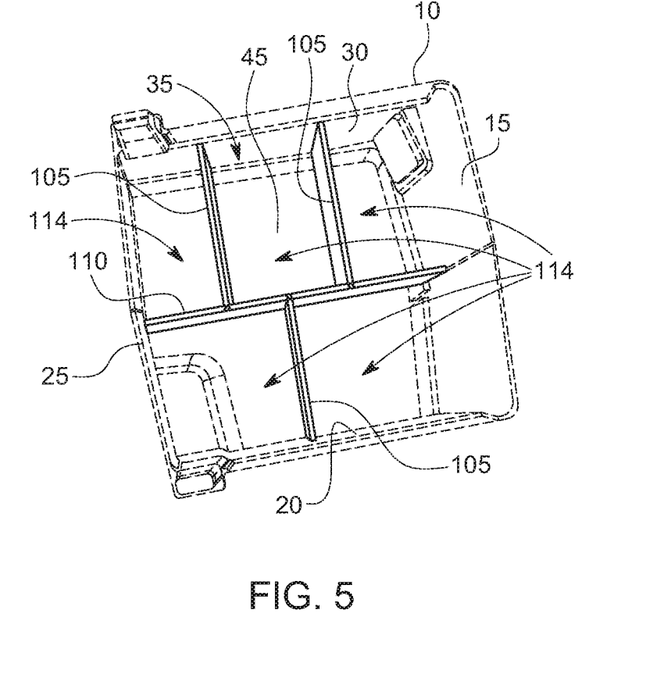
FIG. 5 is a top view of a center console with an organizer installed therein according to one embodiment of the present invention.

In the illustrated embodiment five individual bins 114 are created when received in the intended console 10 and its compartment as is shown in FIG. 5. As shown, the walls of each bin comprise two or more walls of the divider system and portions of one or two walls 15, 20, 25 & 30 of the compartment.

Of important note, the number of mating 110 and joining pieces 105 can vary with different embodiments depending on several factors including, but not limited to, the overall size and configuration of the console compartment and the number of individual bins desired when the organizer system is installed. Further, pieces in some embodiments may include features of both a mating piece and a joining piece. In yet other embodiments, the organizer system can comprise a hybrid of the prior art X-joint divider system referenced in FIG. 1 and the divider system embodiments specifically described herein, wherein the connections between the various pieces include both prior art type X-joint connections and T-joint 117 connections.

The individual pieces 105 & 110 as best shown in FIG. 3 are substantially planar and typically comprise a unreinforced or reinforced plastic material. The pieces are about 0.13" thick although thickness can vary between embodiments. Although shown as being planar, variations need not be planar and can comprise three dimensional features that enhance the configuration and utility of the resulting organizer system. The size and shape of the pieces can also vary significantly and substantially in other embodiments to facilitate a custom fit of the system within a particular console compartment of a particular make and model of vehicle. The pieces can be manufactured by any suitable means, but in at least one variation the pieces are injection molded.

Figure 4A:
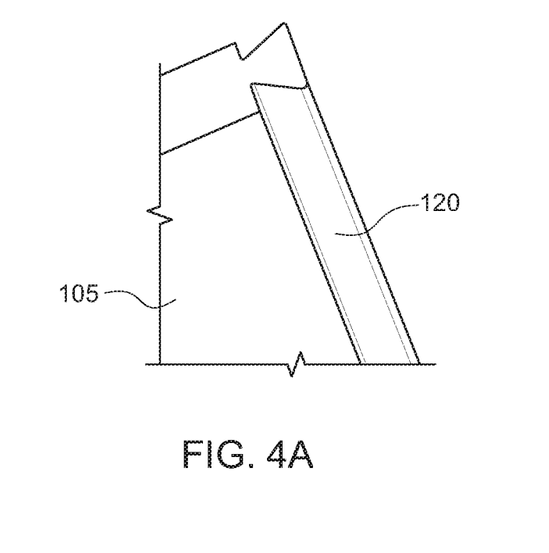
FIG. 4a is a close up partial perspective view of a top portion of a joining end of a joining piece of an organizer according to one embodiment of the present invention.

A joining piece 105 comprises at least one substantially vertical edge (inside edge) 115 having joining features comprising vertically-extending elongated dovetail protrusion 120 at an upper end and a protruding tab 125 at its lower end. The dovetail protrusion with its wedge-shaped cross section is best shown in FIG. 4a. The length of the dovetail protrusion can vary depending on the length of the other dimensions of the joining piece, but it will be long enough to ensure a secure fit with a mating piece 110. The inside edge 120 of the illustrated embodiment is about four inches long and the dovetail protrusion is about 1.25" long. Typically the dovetail protrusion is 20-35% the length of the associated edge.

Figure 4B:
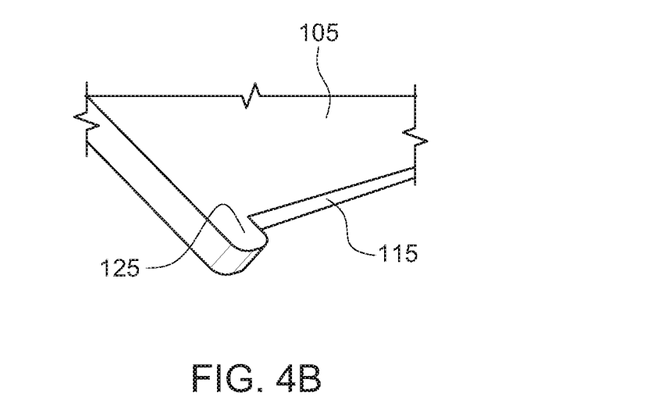
FIG. 4b is a close up partial perspective view of a bottom portion of a joining end of the joining piece of the organizer according to one embodiment of the present invention.

The protruding tab 125 is best shown in FIG. 4b. It is configured to be snappily received in a corresponding lower slot (tab slot) 130 of the mating piece 110. The protruding tab is typically the same thickness as the rest of the mating piece and has a rectangular cross section. The dovetail protrusion 120 and the protruding tab typically extend horizontally outwardly from the associated vertical inner edge a distance substantially equivalent to the thickness of an associated mating piece. Typically the protruding tab is about 4-10% the length of the associated edge. As can be appreciated, it is often desirable to have the aggregate length of the two slots as small a fraction of the total height of the mating piece to maintain the structural integrity of the piece.

The other edges (top and bottom edges) 135 & 140 of the joining piece and specifically the opposing other vertical edge (outside edge) 145 are configured to comport with the associated features and dimensions of the console compartment into which the assembled divider system is to be received. In most embodiments, the vertical outside edge is configured to nest flush against a sidewall 15-30 of the console compartment 35. Variations of the joining pieces can have vertical outside and inside edges 145 & 120 that comprise a dovetail protrusion and a protruding tab on each, wherein this variation would likely be received between two mating pieces 110 in an assembled divider 100.

The illustrated embodiment comprises three substantially identical joining pieces 105; however, other embodiments and variations may comprise a different number of joining pieces as well as joining pieces of different configurations to accommodate the particular configuration of a console compartment.

A mating pieces 110 comprises two generally vertical ends 155 & 160, top and bottom ends 165 & 170 and opposing left and right surfaces 175 & 180. One or more mating features in the form of pairs of vertically aligned dovetail and tab slots 150 & 130 (together comprising "slot pairs") are distributed across its length between the respective ends. The number of slot pairs provided on any particular mating piece can vary although three pairs are shown in the illustrated embodiment. As can be appreciated, the female dovetail slots correspond to and are configured to matingly receive a male dovetail protrusion 115 slidably therein. Further, the tab slots are configured to snappily receive a protruding tab 125 therein. Accordingly, the size, length and configuration of the slots correspond to the associated features of the joining pieces 105.

Figure 4C:
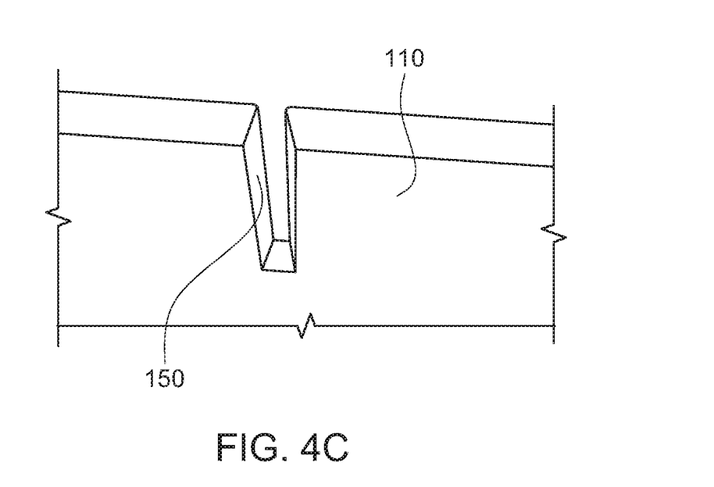
FIG. 4c is a close up partial perspective view of a top portion of a mating feature of a mating piece of the organizer according to one embodiment of the present invention.

A close up view of the dovetail slot 150 is shown in FIG. 4c wherein the non-parallel converging sides of the slot can be seen. With reference to FIG. 3, the narrow side of each slot either faces to one or the other opposing surface of the mating piece 110. The orientation of the dovetail slot determines the orientation of a joining piece received therein. In FIG. 3, one joining piece extends orthogonally to the left from a left surface and two pieces extend orthogonally to the right from a right surface.

Figure 4D:
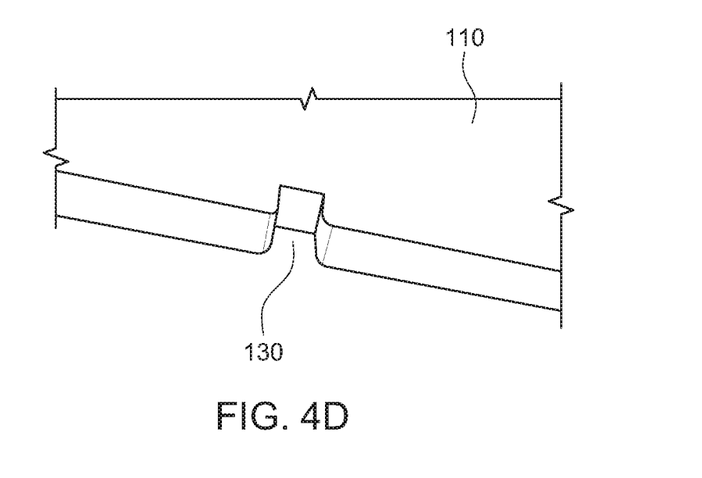
FIG. 4d is a close up partial perspective view of a bottom portion of a mating feature of the mating piece of the organizer according to one embodiment of the present invention.
Figure 4E:
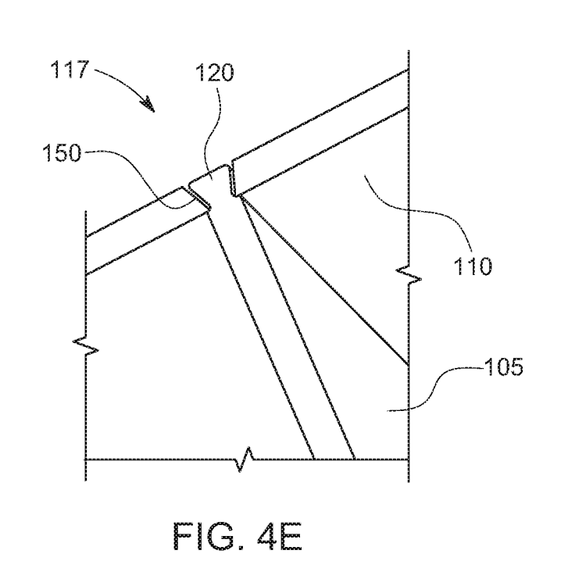
FIG. 4e is a close up partial perspective view of the top portion of the joining end received in the top portion of the mating feature of the organizer according to one embodiment of the present invention.

The interaction between the dovetail slot 150 when an associated dovetail protrusion 115 is received therein as shown in FIG. 4e permits only vertical movement of the joining piece 105 relative to the mating piece 110 and inhibits horizontal movement. The receipt of the protruding tab 125 in the tab slot 130 as prevents the joining piece from being moved vertically upwardly; whereas, the bottom of the dovetail slot interacting with the bottom of the dovetail protrusion prohibits further downwardly movement of the joining piece effectively locking it in place. A close-up of the tab slot is shown in FIG. 4d.

Of particular note as shown in FIGS. 2, 4e, 5 & 6 the back surface of the dovetail protrusion 115 and the protruding tab 125 are substantially flush with the opposing surface of the mating piece 110, such that the joining piece 105 does not appreciably extend into the bin opposite it on the other side of the mating piece. In some variations, the joining piece may extend a short or distance beyond the opposing surface, but typically it will not appreciably impact the storage capacity or utility of the opposite bin.

The embodiment system of FIG. 3 shows a mating piece 110 with three slot pairs to receive three joining pieces 105. Variations are known wherein additional slot pairs are provided than joining pieces utilized so that the end user can pick the slots he/she would like the joining pieces 105 installed allowing the end user the ability to configure the size of the resulting bins. Additionally, the presence of more slot pairs can permit an end user to configure the system with less than the full complement of joining pieces when he/she desires larger bins.

Although not illustrated, hybrid pieces are also known wherein the piece has one or more ends of a joining piece and one or more slot pairs distributed along its length.

Installation of Embodiments of a Console Organizer

Figure 6:
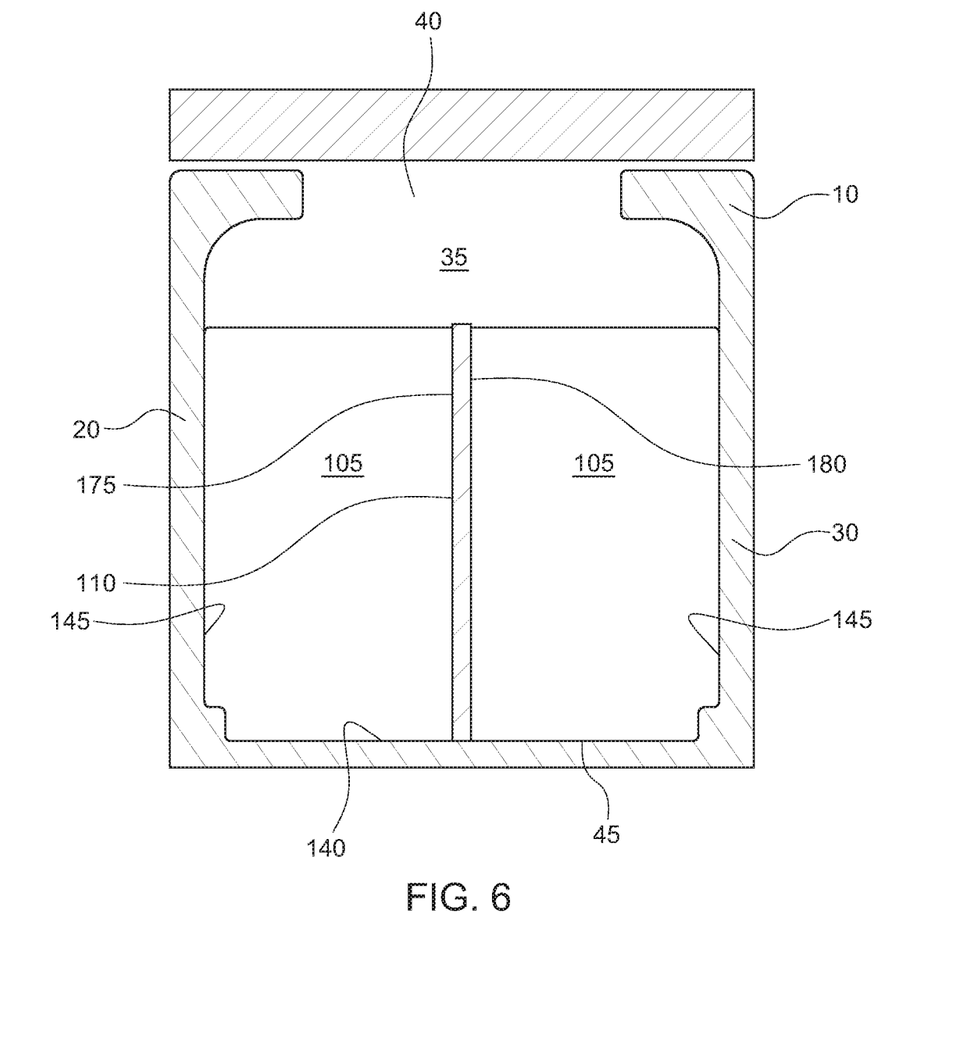
FIG. 6 is a cross sectional side view of a center console with an organizer therein according to one embodiment of the present invention.

One of the benefits of certain embodiments of the divider system 100 is that it can be installed in vehicle center consoles 10 where the console's top opening 40 is smaller in width and/or length than the floor of the console compartment's floor (or bottom) 45. FIG. 6 is a cross sectional view of a console wherein the width of the top opening is smaller than the width of the compartment's floor.

It is difficult, if not impossible, to fit X-joint-type divider systems 05 as illustrated in prior art FIG. 1 through a smaller opening and also have the edges of the divider pieces span from sidewall to sidewall of the console compartment. In sharp contrast embodiments of the present invention depending on the design and placement of the various joining and mating pieces 105 & 110 relative to each other can be angled as they are past through the smaller console opening 40 and then re-orientated to be flush against the console's floor 45 with the outside edges 145 of the joining pieces and the mating piece ends 155 & 160 fully spanning from respective sidewall 15,25 to sidewall 20,30. With reference to FIGS. 2 & 5, the fact that the divider bin walls formed by the joining pieces extending orthogonally from the mating piece at the T-joints 117 are not linearly aligned with each other on opposing sides 175 & 180 of the mating piece permits the divider systems to be tilted and skewed to sufficiently to fit through much smaller openings than the prior art X-joint-type divider systems having a similar width and length.

An embodiment of the divider system 100 can be assembled, fully or partially, either outside of or inside the intended vehicle console compartment 35 depending on the configuration of the console compartment and the configuration of the divider system. The system is assembled by aligning the bottom of a dovetail protrusion 115 on a joining piece 105 with the top of the appropriate dovetail slot 150 on the mating piece 110. Once aligned, the joining piece is slid downwardly. Of important note, the inside edge 120 of the joining piece will be pushed outwardly by the protruding tab 125 impinging against the side of the mating piece such that the edge of the joining piece will not be parallel with the mating piece side wall. This will cause the joining piece to resiliently flex and impart a biasing force against the mating piece side often requiring the assembling user to apply additional force to facilitate sliding the dovetail protrusion fully into the dovetail slot.

Once the dovetail protrusion 115 is fully received in the dovetail slot 150, it will bottom out against the bottom of the slot and in typical embodiments, the top surface of the joining and mating pieces 105&110 will be aligned with each other. Further, the protruding tab 125 will be snappily received in the protrusion slot 130. This process is repeated for each joining piece until all have been attached to the mating piece.

To place the embodiment in the console 10 especially where the top opening 40 of the console is smaller than the bottom part and floor 45 of the console, the assembled divider system 100 is generally properly orientated relative to the console compartment 35 and then tilted and angle as necessary to pass it through the smaller opening. Once the divider has been placed on the floor of the compartment, it can be rotated as necessary to properly position it in place with the outside edges 145 of each mating and joining piece, as applicable, fitting directly against the inside walls 15-30 of the compartment.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

As indicated above, the number of mating and joining pieces can vary. Further, different configurations of joining pieces and mating pieces can be used for anyone divider system. Additionally, hybrid pieces can also be used that have features of both mating and joining pieces. In other embodiments the specific shape of the pieces can be other than planar with contours and curvatures to enhance the utility of the divider system as well as clear or interact with features provided in the console compartment.

In the illustrated embodiment, the pieces are joined together by way of dovetail joints such that the backside of the dovetail protrusion is flush with the opposing side of a mating piece. Other types of joints can be utilized as well. For instance slots of various shapes can be formed on the mating pieces into which correspondingly-shaped ends slide into the slots. The joints need not create flush backsides as the illustrated embodiments, but rather bulges or protrusions can be provided on the mating pieces that provide a mechanism for joining with a suitably configured joining piece. For instance, a elongated slot, such as a dovetail slot or otherwise could be formed into the end of a joining piece that might flare to become thicker near its end to provide structure for the slot, and a joint protrusion, such as a protruding dovetail could be formed on the mating piece surface. While the mating features as shown in the illustrations are of a female configuration and the joining features as shown are of a male configuration, variations and embodiments are contemplated wherein these orientations are switched. As would be obvious to one of ordinary skill in the art given the benefit of this disclosure, any number of joint designs are possible.

I claim:

1. A divider system for a compartment having a plurality of interior sidewalls to divide the compartment into a plurality of bins, the divider system comprising:
    at least one mating piece having a length, a height, a left surface, a right surface, a first end, a second end, a top end and a bottom end, the mating piece having at least first and second mating features, the first mating feature being located at a first position along the length, and a second mating feature being located at a second position along the length, the first and second positions being different from one another; and
    at least first and second joining pieces, the first joining piece having a first inside edge and a first outside edge with at least the first inside edge including a first joining feature having-configuration different from a configuration of the first mating feature, and the second joining piece having a second inside edge and a second outside edge with at least the second inside edge including a second joining feature having-a configuration different from a configuration of the second mating feature;
    wherein (i) the first mating feature is coupled to the first joining feature to form a first T-joint with the first joining piece extending generally orthogonally outwardly from the left surface, (ii) the second mating feature is coupled to the second joining feature to form a second T-joint with the second joining piece extending generally orthogonally outwardly from the right surface, and (iii) the first and second T-joints each comprise a dovetail protrusion received in a dovetail slot in combination with a protruding tab received in a tab slot.

2. The divider system of claim 1, wherein the first and second mating pieces and the first and second joining pieces are generally planar.

3. The divider system of claim 1, wherein the first joining piece does not extend outwardly from the right surface, and the second joining piece does not extend outwardly from the left surface.

4. A combination comprising the divider system of claim 1 and a vehicle center console, the vehicle center console comprising the compartment, the plurality of interior sidewalls including left, right, back and front interior sidewalls, the vehicle center console also having a top end including an opening into the compartment and an interior compartment floor, wherein the divider system is received in the compartment resting on the interior compartment floor and wherein the first end, second end, first outside edge and the second outside edge are in direct contact with the respective left, right, front and back interior walls.

5. The combination of claim 4, wherein the opening is smaller in opening width than a compartment width of the compartment proximate the interior compartment floor.

6. The divider system of claim 1, wherein (i) each of the first and second dovetail slots extend substantially vertically downwardly from the top end, (ii) each of the first and second tab slots extend upwardly from the bottom end, (iii) the first and second dovetail protrusions being configured for slidable receipt into the respective first and second dovetail slots, and (iv) the first and second protruding tabs being configured for receipt into the respective first and second tab slots when the associated joining piece is coupled to the mating piece.

7. The divider system of claim 1, wherein each dovetail slot extends substantially vertically downwardly from the top end and each tab slot extends substantially vertically upwardly from the bottom end.

8. The divider system of claim 6, wherein a length of the dovetail slot is not greater than 35% percent of a height of the mating piece.

9. The divider system of claim 8, wherein a length of the tab slot is not greater than 10% percent of the height of the mating piece.

10. The divider system of claim 1, wherein the mating piece has a third mating feature being located at a third position along the length with the third position being different from the first and second positions, and the divider system further comprising a third joining piece, the third joining piece having a third inside edge and a third outside edge with at least the third inside edge including a third joining feature having a configuration different from a configuration of the third mating feature.

11. A method of configuring and installing the divider system of claim 1 into the compartment, the method comprising:
    coupling the first joining piece to the first mating feature;
    coupling the second joining piece to the second mating feature;
    lowering an assembled divider system into the compartment; and
    positioning the assembled divider in the compartment with the first end, the second end, and the first and second outside edges all in contact with respective interior sidewalls.

12. A method of configuring and installing the divider system of claim 1 into the compartment, the method comprising:
- sliding the first dovetail protrusion downwardly into the first dovetail slot until the first protruding tab is snappily received in the first tab slot;
- sliding the second dovetail protrusion downwardly into the second dovetail slot until the second protruding tab is snappily received in the second tab slot;
- lowering an assembled divider system into the compartment; and
- positioning the assembled divider in the compartment with the first end, the second end, and the first and second outside edges all in contact with respective interior sidewalls.

13. A method of configuring and installing the divider system of claim 1 into the compartment, the method comprising:
- coupling the first joining piece to the first mating feature to form a partially assembled divider system;
- lowering the partially assembled divider system into the compartment;
- coupling the second joining piece to the second mating feature while the partially assembled divider system is in the compartment to create an assembled divider system; and
- positioning the assembled divider in the compartment with the first end, the second end, and the first and second outside edges all in contact with respective interior sidewalls.

\* \* \* \* \*